(12) United States Patent
Dunstan et al.

(10) Patent No.: US 10,425,336 B2
(45) Date of Patent: Sep. 24, 2019

(54) SYSTEM AND METHOD OF ADAPTIVE CONGESTION MANAGEMENT

(75) Inventors: Adam Dunstan, Watertown, MA (US); Christopher W. Gunner, Harvard, MA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 64 days.

(21) Appl. No.: 13/532,094

(22) Filed: Jun. 25, 2012

(65) Prior Publication Data

US 2013/0163429 A1 Jun. 27, 2013

Related U.S. Application Data (60) Provisional application No. 61/500,851, filed on Jun. 24, 2011.

(51) Int. Cl.
| | | |
|---|---|---|
| H04J 14/02 | (2006.01) | |
| H04L 12/801 | (2013.01) | |
| H04L 12/825 | (2013.01) | |

(52) U.S. Cl.
CPC ............ *H04L 47/12* (2013.01); *H04L 47/263* (2013.01)

(58) Field of Classification Search
CPC ....................................................... H04L 74/12
USPC ........................................ 370/229, 232, 235
See application file for complete search history.

(56) References Cited

U.S. PATENT DOCUMENTS

| | | | |
|---|---|---|---|
| 5,335,224 A * | 8/1994 | Cole et al. ..................... 370/235 |
| 5,673,253 A * | 9/1997 | Shaffer .......................... 370/229 |
| 6,504,818 B1 * | 1/2003 | Levine .......................... 370/229 |
| 6,847,969 B1 * | 1/2005 | Mathai et al. | |
| 7,079,904 B1 * | 7/2006 | Forstrom et al. ............... 700/28 |
| 7,197,244 B2 * | 3/2007 | Thomas ............. H04J 14/0282 348/E7.07 |
| 7,519,705 B1 * | 4/2009 | Papagiannaki ..... H04L 43/0876 709/224 |
| 7,519,916 B1 * | 4/2009 | Hartwell et al. .............. 715/771 |
| 7,697,422 B1 * | 4/2010 | Arad ...................... H04L 47/10 370/229 |
| 8,041,022 B1 * | 10/2011 | Andreasen ........... G06Q 20/102 370/390 |
| 8,125,967 B1 * | 2/2012 | Talley ................... H04W 68/02 370/338 |
| 8,229,470 B1 * | 7/2012 | Ranjan .................. H04W 4/029 455/456.3 |
| 8,509,071 B1 * | 8/2013 | Narayanaswamy ........................ H04L 41/5025 370/230 |
| 8,543,685 B1 * | 9/2013 | Gormley ....................... 709/224 |
| 8,756,322 B1 * | 6/2014 | Lynch .......................... 709/226 |
| 8,949,394 B1 * | 2/2015 | Papagiannaki ....... H04L 41/147 709/223 |

(Continued)

FOREIGN PATENT DOCUMENTS

WO WO2011/120229 * 10/2011

*Primary Examiner* — Sulaiman Nooristany (57) ABSTRACT

A system and method for adaptive congestion management uses measurements of usage of each edge network segment both per-customer and for each edge network segment as a whole. The technique then processes these measurements to determine what changes to make to allowed transfer rates to alleviate congestion. Adaptive congestion management also uses these measurements to determine when to remove any restrictions on transfer rates in the case that the edge network segment is no longer congested.

18 Claims, 3 Drawing Sheets

(56) References Cited

U.S. PATENT DOCUMENTS

| | | | |
|---|---|---|---|
| 2005/0052992 A1* | 3/2005 | Cloonan | H04L 12/5695 370/229 |
| 2006/0222008 A1* | 10/2006 | Aaron | H04L 41/0896 370/468 |
| 2007/0021859 A1* | 1/2007 | Lev-Ami | G05B 23/0254 700/121 |
| 2007/0297590 A1* | 12/2007 | Macbeth | G06Q 10/00 379/201.02 |
| 2008/0049639 A1* | 2/2008 | Wiley et al. | 370/252 |
| 2008/0052718 A1* | 2/2008 | Hundscheidt | 718/104 |
| 2008/0192773 A1* | 8/2008 | Ou et al. | 370/468 |
| 2008/0208363 A1* | 8/2008 | Grgic | G05B 19/042 700/2 |
| 2008/0227404 A1* | 9/2008 | Harel | H04B 7/0632 455/69 |
| 2008/0263632 A1* | 10/2008 | Keon | 726/3 |
| 2009/0070129 A1* | 3/2009 | Inbar et al. | 705/1 |
| 2010/0188975 A1* | 7/2010 | Raleigh | G06Q 10/06375 370/230.1 |
| 2011/0268025 A1* | 11/2011 | Sunder Rajan et al. | 370/328 |
| 2011/0280130 A1* | 11/2011 | Foottit et al. | 370/236 |
| 2011/0314145 A1* | 12/2011 | Raleigh | H04L 41/0893 709/224 |
| 2012/0101952 A1* | 4/2012 | Raleigh | G06Q 30/016 705/304 |
| 2013/0016624 A1* | 1/2013 | Li et al. | 370/252 |
| 2013/0024901 A1* | 1/2013 | Sharif-Ahmadi | H04L 41/12 725/114 |
| 2013/0088997 A1* | 4/2013 | Briscoe | H04L 47/10 370/252 |
| 2014/0198687 A1* | 7/2014 | Raleigh | 370/259 |

\* cited by examiner

SYSTEM AND METHOD OF ADAPTIVE CONGESTION MANAGEMENT

CROSS-REFERENCE TO RELATED APPLICATIONS

This application claims priority to U.S. Provisional Patent Application No. 61/500,851 entitled SYSTEM AND METHOD OF ADAPTIVE CONGESTION MANAGEMENT, filed on Jun. 24, 2011, which is incorporated herein by reference in its entirety.

FIELD

The present disclosure relates to congestion management for broadband data services. In particular, the present disclosure relates to adaptive congestion management on edge network segments.

BACKGROUND

Physical network infrastructures used by a broadband data service providers generally includes edge network segments to which customer devices are attached. In the cable television industry, the edge network segments include a Hybrid Fiber Coaxial physical infrastructure over which data is transferred using a DOCSIS set of standards. In the telecommunications industry, the edge network segments include Digital Subscriber Loop (DSL) connections between Broadband Remote Access Servers (BRAS) and the customer device(s). In both of these industries, edge network segments using WiFi access standards are also being deployed.

Digital service providers allocate bandwidth based on an over-subscription model in which the sum of all the allowed maximum data transfer rates for all customers attached to a physical segment greatly exceeds the actual available bandwidth of the segment. Such over-subscription models rely on statistical multiplexing based on assumptions that not all customers actively transfer data at the same time, for example. However, customer demand for more bandwidth per segment is increasing rapidly due in large part to the availability of content over the Internet such as video.

As customer demand for bandwidth rapidly increases, edge network segments are becoming increasingly congested. In some areas, the demand for additional bandwidth on a network edge segment exceeds the bandwidth available on the segment. When this occurs, customers may not have access to their desired amount of bandwidth. This reduction in bandwidth for each customer can cause customer dissatisfaction resulting lost revenue for the digital service providers.

Digital service providers may need to incur substantial costs to add capacity or may use a number of congestion management techniques to mitigate congestion on edge network segments. For example, providers may use active management techniques which reduce the permitted bandwidth for a subset of customers who are using the greatest amount of bandwidth. This technique restricts a relatively small number of customers to benefit the remaining customers.

Currently used active management techniques may not be optimal for congestion management and can be ineffective. For example, one common congestion management technique reduces a maximum allowed transfer rate for customers with high usage of the segment for a period of time. This technique reduces the maximum allowed rate be a fixed amount, which may be based on a provisioned maximum allowed rate for a customer. This technique can be ineffective, for example, when congestion is severe enough that the customers are only achieving less than the reduced maximum allowed rate. In that case the rate change has no effect. Another congestion management technique enforces maximum allowed rates for various types of digital traffic. However, this technique does not directly measure the congestion state of edge network segments and may therefore result in too much or too little rate limiting for optimal congestion management.

SUMMARY

In illustrative embodiments, systems and methods for adaptive congestion management for broadband data services are disclosed herein. In particular, the systems and methods disclosed herein relate to adaptive congestion management of edge network segments where the physical network infrastructure may be heavily over-subscribed.

In an illustrative embodiment, adaptive congestion management improves on existing congestion management techniques. Adaptive congestion management uses measurements of usage of each edge network segment both per-customer and for each edge network segment as a whole. The technique then processes these measurements to determine what changes to make to allowed transfer rates to alleviate congestion. Adaptive congestion management also uses these measurements to determine when to remove any restrictions on transfer rates in the case that the edge network segment is no longer congested.

In an illustrative embodiment, a method for adaptive congestion management is disclosed herein. The method includes gathering periodic measurement data of usage of an edge network segment and determining when the edge network segment crosses a threshold from uncongested to congested. When the edge segment crosses the threshold from uncongested to congested, the method includes determining a calculated profile for customers on the edge segment, and computing a restricted transfer rate corresponding to each of one or more of the customers. The restricted transfer rate can then be applied to each of the one or more of the customers to reduce the congestion on the edge segment.

In another illustrative embodiment, when the edge network segment crosses back over the threshold from congested to uncongested, the method includes determining if customers on the edge segment have the restricted transfer rate. If customers do have the restricted transfer rate, the method includes removing the restricted transfer rate from at least a subset of those customers.

In an illustrative embodiment, a broadband network service is delivered by a broadband service provider (provider) using a physical network infrastructure. However, the systems and methods disclosed herein can be applied to various different types of data services in which a resource management system can measure per-customer/subscriber usage and per-physical segment usage.

BRIEF DESCRIPTION OF THE DRAWINGS

The systems and methods disclosed herein are illustrated in the figures of the accompanying drawings which are meant to be exemplary and not limiting, in which like references are intended to refer to like or corresponding parts.

DETAILED DESCRIPTION

Detailed embodiments of the systems and methods for congestion management for broadband data services are disclosed herein, however, it is to be understood that the disclosed embodiments are merely exemplary of the systems and methods, which may be embodied in various forms. Therefore, specific functional details disclosed herein are not to be interpreted as limiting, but merely as a basis for the claims and as a representative basis for teaching one skilled in the art to variously employ the systems and methods disclosed herein.

Adaptive Congestion Management

Figure 1:
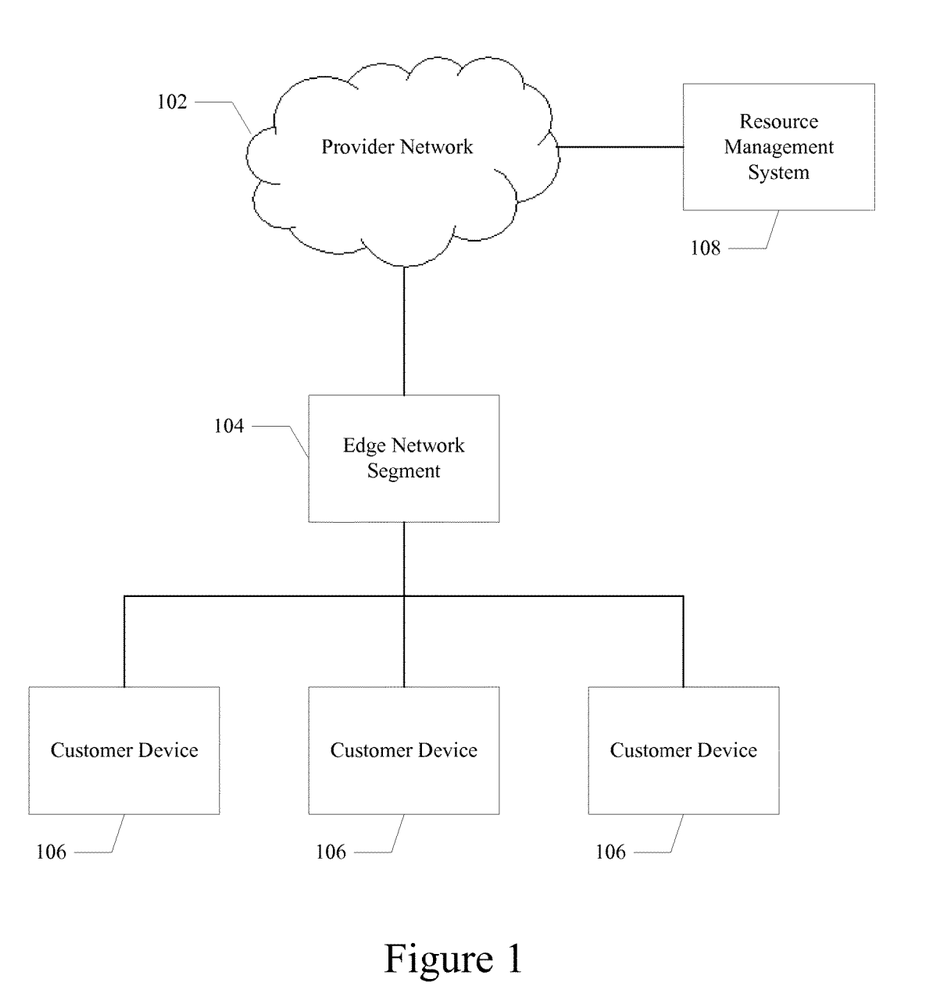
FIG. 1 illustrates an embodiment of a provider network infrastructure.

Systems and methods for adaptive congestion management for broadband data services are disclosed herein. Adaptive congestion management improves on existing congestion management techniques. A general provider network infrastructure according to an illustrative embodiment is described with reference to FIG. 1. As illustrated in FIG. 1, a provider network 102 includes one or more edge network segments 104 (also referred to herein as "segment" and edge segments) at an edge of the provider network to which one or more customer devices 106 is attached.

In an illustrative embodiment, adaptive congestion management uses measurements of usage of each edge network segment 104 both per-customer and per-segment as a whole. The technique then processes these measurements to determine what changes to make to allowed transfer rates to alleviate congestion. Adaptive congestion management also uses these measurements to determine when to remove any restrictions on transfer rates in the case that the edge network segment 104 is no longer congested.

In an illustrative embodiment, a resource management system 108, in communication with the provider network 102, implements the adaptive congestion management functions. The resource management system 108 can gather the measurement data from the provider network 102 using various existing network management protocols, such as but not limited to: DOCSIS IPDR, which is generally used in the cable industry; RADIUS, DIAMETER, which is generally used in the wireline, mobile industries and WiFi; SNMP, which is in general use; and Netflow, which is in general use to measure characteristics of discrete data transfers usually using sampling.

The above protocols allow periodic measurement of the per-customer and per-segment usage data. The above protocols also allow active control of the per-customer allowed transfer rates by using the protocol to set attributes of the transfer policing technique in use on the edge network segment 104.

Generally, the transfer policing for a customer is implemented by the equipment that provides the edge network segment 104 data transfer using a token bucket mechanism. Such a token bucket generally has a number of attributes. The token bucket may have a maximum rate attribute, which may define a token fill rate for the token bucket and wherein the maximum sustained transfer rate is usually expressed in bits per second. The token bucket may have a burst size attribute, wherein a depth of the token bucket is usually expressed in bytes. The token bucket may have a burst rate attribute, which may define a maximum transfer rate allowed when draining the bucket of accumulated tokens. The burst rate attribute may not be present in all implementations. If the burst rate attribute is not implemented then it can be limited by the maximum possible transfer rate of the edge network segment.

Typically associated with each per-customer transfer token bucket is a queue to which packets received by the edge equipment for a customer are queued awaiting transfer when allowed by the token bucket. The queue usually has attributes that determine the maximum number of bytes or packets or both that are allowed to be queued (the queue depth). If the queue depth is met or exceeded then a received packet is discarded.

In an illustrative embodiment, the maximum rate establishes the rate at which data can be transferred to a customer when the token bucket is empty. During periods when the received data rate for a customer is less than the maximum rate, the token bucket accumulates unused tokens up to the burst size. If the received rate then exceeds the maximum rate for a period then the transfer can be done at the burst rate while the token bucket is non-empty. Once the token bucket is emptied, the transfer rate drops back to the maximum rate.

When data is received and has to be queued before it is allowed to be sent because the token bucket is empty, then some edge equipment implementations count each such packet that arrives as a "delay" packet. The protocols for measurement described earlier allow the resource management system 108 to gather those delay packet counts in addition to the other usage data. The protocols also allow the resource management system 108 to gather the count of discarded packets.

In addition to the per-customer policing step above, the edge segment equipment may also limit the aggregate transfer rate for the edge network segment 104 to its maximum possible rate. Limiting the aggregate transfer rate for the edge network segment 104 is typically done by effectively reducing the rate at which data is taken from all token buckets. This has the effect on a congested edge network segment of reducing the achieved transfer rate for all customers that have data ready to be transferred (and allowed by their token bucket). This has the undesirable effect of reducing the achieved rate for all customers regardless of the effect that it may have which varies by application data type. For example, a well-known application type that uses high transfer rates for sustained periods of time is file transfer. A second well-known application type that uses lower transfer rates for sustained periods of time is video data transfer. A third well-known application type that uses variable transfer rates for short periods of time is interactive Internet Web browsing. From the customer's perspective, file transfer is not particularly sensitive to having its allowed transfer rate reduced; video transfer rate can be reduced such that the quality of the video resolution is reduced and this is preferable for customer experience rather than discarding data; Web transfer is sensitive to transfer rate since it directly affects the customer's experience as the customer waits for Web pages to be displayed.

Segment Congestion Measurement

In an illustrative embodiment, one or more of the protocols described above is used by the resource management system 108 to gather periodic measurements of the usage of each edge network segment 104. In addition, the resource management system 108 can use one or more of those protocols to obtain the characteristics of each edge network segment 104, such as the maximum transfer rate (bandwidth). Such periodic measurements can be obtained frequently, for example, every minute.

Using the recent history of measurements for each edge network segment 104 the resource management system 108 can decide whether each edge network segment 104 is congested or not. Since the timescale for controlling the allowed rate for a customer is typically longer than the segment measurement rate, it is not usually preferred to simply use the last per-minute segment measurement to make the congested decision.

Instead, in an illustrative embodiment a method for deciding the congestion state uses an Exponentially Weighted Moving Average (EWMA) of the recent history of measurements. In this embodiment, parameters are configured which determine the operation of the EWMA method, such as but not limited to a Weighting factor, which is a multiplier to apply to the current EWMA value. The Weighting factor is always a value less than 1. By adjusting the Weighting factor the EWMA computed value at each new measurement period can be made more or less sensitive to older measurements.

In an illustrative embodiment, using EWMA at each measurement interval, the resource management system 108 calculates the new EWMA value for each edge network segment 104. Then using a configurable attribute for the congestion threshold, such as a percentage of the maximum possible transfer rate of an edge network segment 104, and using the actual maximum possible transfer rate for an edge network segment 104 obtained using one of the protocols, the resource management system 108 calculates whether the EWMA usage value exceeds the configured threshold or not.

In another illustrative embodiment, two separate EWMA usage values are computed and maintained for each an edge network segment 104. The first EWMA is used to determine when an edge network segment 104 crosses from uncongested to congested. While the second EWMA is used to determine when an edge network segment 104 crosses from congested to uncongested. In this embodiment, the second EWMA has a larger weighting factor such that it is affected by a longer time span of measurements than the first EWMA. This has the effect of the detection of the uncongested to congested threshold crossing being faster with respect to recent history than the detection of the congested to uncongested threshold crossing.

Customer Congestion Management

In an illustrative embodiment, when an edge network segment 104 has been determined to be congested by the method described above, the resource management system 108 uses further per-customer calculations using the per-customer measurements to determine which customers to actively manage by reducing their transfer parameters. In addition, the resource management system 108 calculates, from the measurement data, the usage profile for each customer. The profile is the pattern to which that customer's recent history conforms.

The per-customer calculations use one or more inputs. The inputs may include, but are not limited to: recent history of usage measurements, for example transferred bytes and packets; recent history of delayed and discarded packets, for example when available from the edge equipment; and provisioned transfer parameters for the customer, which may be obtained by the protocols described above or through configuration. The inputs may also include configured parameters that determine per-profile reduced transfer parameters when a customer is actively managed. The configured parameters may include a maximum rate factor, such as a multiplier (e.g. a percentage) to apply to the measured rate which then determines the new maximum rate value to apply. The configured parameters may include a burst size, such as a new burst size to apply. The configured parameters may also include a burst rate factor, such as a multiplier (e.g. a percentage) to apply to the measured rate which then determines the new burst rate value to apply.

Profile Calculation

In an illustrative embodiment, the per-customer data measurement periodicity is about 5 minutes, but may be up to about 15 minutes. In order to calculate the profile to which a customer's usage conforms, the resource management system 108 uses the recent history of usage data and configured match parameters that define the characteristics of each profile. The profiles and match parameters may include but are not limited to FileTransfer and Video. For example, the profiles and match parameters may include a FileTransfer. The FileTransfer may include a minimum actual rate, such as a threshold of achieved transfer rate above which the pattern matches FileTransfer; a minimum delay ratio, such as a threshold ratio of actual delayed packets above which the pattern matches FileTransfer, wherein the actual delay ratio is computed from the delay packet count divided by the total packet count; and/or a time span, such as a duration of recent measurement data to use for matching.

In another example, the profiles and match parameters may include a Video_1. The Video_1 may include a minimum actual rate, such as a threshold of achieved transfer rate above which the pattern matches HDVideo; a maximum delay ratio, such as a threshold ratio of actual delayed packets below which the pattern matches HDVideo, wherein the actual delay ratio is computed from the delay packet count divided by the total packet count; and/or a time span, such as a duration of recent measurement data to use for matching.

In an illustrative embodiment, other Video profiles can be defined by assigning different match parameter values. For Video profiles the actual transfer rate is relatively constant over the time duration of the video content, for example, 90 minutes for a full movie. In addition, for each video resolution there is generally a specific relatively constant rate.

In an illustrative embodiment, the resource management system 108 computes the profile (if any) that the customer actual usage pattern matches using the above parameters. It does so each time there is new periodic usage measurement data available.

Segment Crosses Uncongested to Congested Threshold

Figure 2:
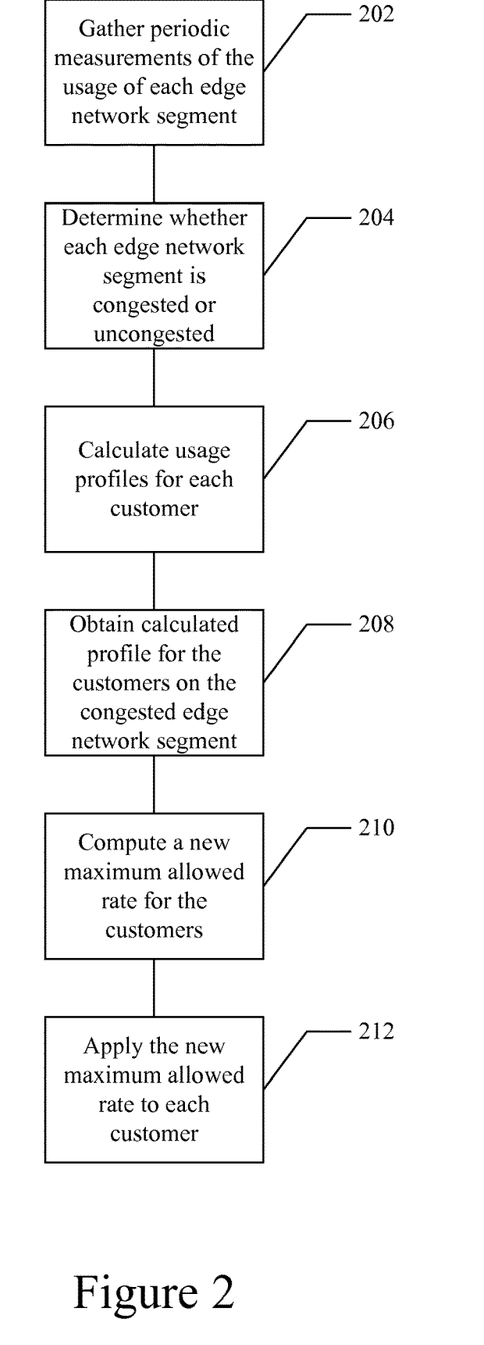
FIG. 2 illustrates a block diagram of an embodiment of a method of adaptive congestion management for an edge network segment that crosses from uncongested to congested.

A method of adaptive congestion management for an edge network segment that crosses from uncongested to congested according to an illustrative embodiment is described with reference to FIG. 2. As described above, the resource management system gathers periodic measurements of the usage of each edge network segment, illustrated as block 202, and determines whether each edge network segment is congested or not, illustrated as block 204. Additionally, as described above, the resource management system can calculate usage profiles for each customer, illustrated as block 206.

In an illustrative embodiment, when the edge network segment is determined by the resource management system to have become congested, the resource management system then takes the calculated profile for each customer on that edge network segment, illustrated as block 208, to determine what changes to make to allowed transfer rates and for which set of customers.

In an illustrative embodiment, the resource management system implements the following algorithm or methodology:

On the first period at which the congestion threshold is crossed, take the set of FileTransfer profile customers, illustrated as block 208. For each such customer, compute a new maximum allowed rate for the customers, illustrated as block 210. The new maximum allowed rate may be calculated by taking the actual measured data rate over the profile time span and multiplying by the maximum rate factor. This yields a new maximum allowed rate that is less than the current rate. Then apply the new maximum allowed rate to each such customer, illustrated as block 212. The new maximum allowed rate may be applied to each such customer using a protocol, as described above, to communicate that change with the edge equipment. In an alternative algorithm or method, a new burst rate can be computed by multiplying the actual measured data rate over the profile time span by the burst rate factor. The new burst rate and the burst size are then also set along with the new maximum allowed rate.

On subsequent segment usage measurement periods, if the edge network segment remains congested, then take the set of Video profile customers, illustrated as block 208. For each such customer compute a new maximum allowed rate, illustrated as block 210. The a new maximum allowed rate may be calculated by taking the actual measured data rate over the profile time span and multiplying by the maximum rate factor. This yields a new maximum allowed rate that is less than the current rate. Then apply the new maximum allowed rate to each such customer, illustrated as block 212. The new maximum allowed rate may be applied to each such customer using a protocol, as described above, to communicate that change with the edge equipment.

Segment Crosses Congested to Uncongested Threshold

Figure 3:
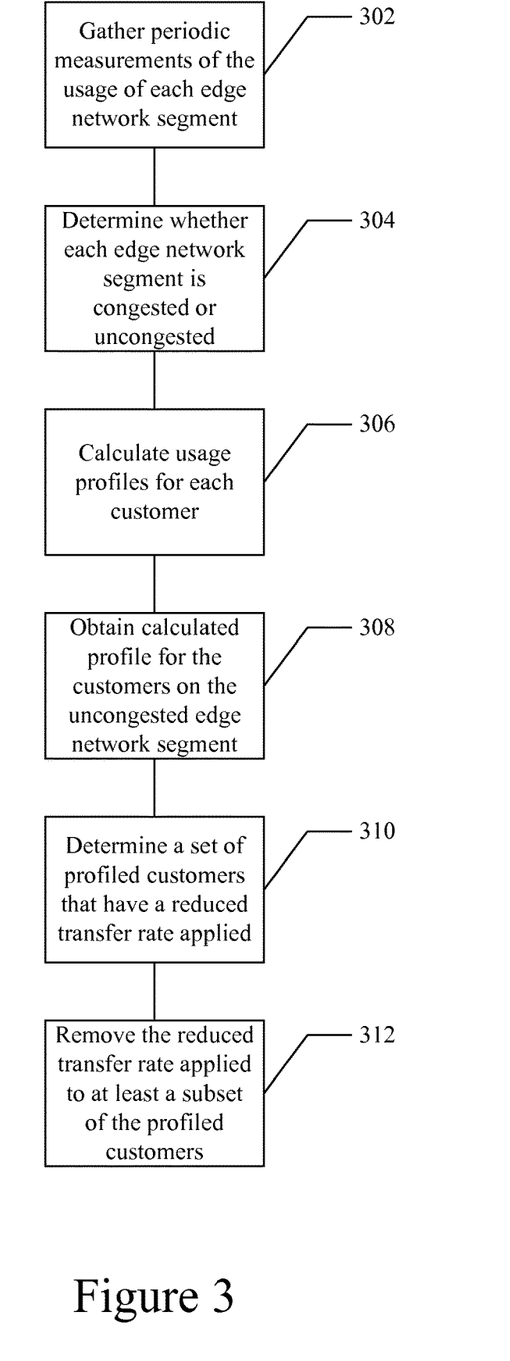
FIG. 3 illustrates a block diagram of an embodiment of a method of adaptive congestion management for an edge network segment that crosses from congested to uncongested.

A method of adaptive congestion management for an edge network segment that crosses from congested to uncongested according to an illustrative embodiment is described with reference to FIG. 3. As described above, the resource management system gathers periodic measurements of the usage of each edge network segment, illustrated as block 302, and determines whether each edge network segment is congested or not, illustrated as block 304. Additionally, as described above, the resource management system can calculate usage profiles for each customer, illustrated as block 306.

In an illustrative embodiment, when the resource management system determines that the edge network segment has become uncongested, as described above, the resource management system obtains the calculated profile for the customers on the uncongested edge network segment, illustrated as block 308. The resource management system then takes the set of profiled customers that have reduced transfer parameter settings, illustrated as block 310, and removes the reduced transfer parameter settings applied to one or more of the profiled customers, illustrated as block 312. The removal is performed using a protocol, as described above, to communicate with the edge equipment to make the changes.

In an illustrative embodiment, the resource management system implements the following algorithm or methodology to avoid the possibility of immediately causing congestion:

On the first period when the segment congestion measurement calculation determines that the edge network segment has now become uncongested, take a set of profiled Video customers that have reduced rates applied, illustrated as block 310. If that set is empty then take a set of FileTransfer customers that have reduced rates applied, illustrated as block 310. With the set so derived, select a random subset, for example, by choosing a fraction of the set at random. Then remove the reduced rate restriction for that selected subset, illustrated as block 312.

On subsequent periods, while the edge network segment remains uncongested, compute a new set of customers, as described above, and again take a random subset of those and remove the rate restrictions for that subset. In this embodiment, the subset at each step is selected using the same fraction parameter such that as the algorithm iterates at each segment measurement period, the algorithm exponentially reduces the set of remaining reduced rate customers.

For a firmware and/or software implementation, the methodologies may be implemented with modules (e.g., procedures, functions, and so on) that perform the functions described herein. A machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to types of long term, short term, volatile, nonvolatile, or other memory and is not to be limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include RAM, ROM, EEPROM, CD-ROM or other optical disk storage, magnetic disk storage or other magnetic storage devices, or other medium that can be used to store desired program code in the form of instructions or data structures and that can be accessed by a computer; disk and disc, as used herein, includes compact disc (CD), laser disc, optical disc, digital versatile disc (DVD), floppy disc and blu-ray disc where disks usually reproduce data magnetically, while discs reproduce data optically with lasers. Combinations of the above should also be included within the scope of computer-readable media.

Although the present disclosure and its advantages have been described in detail, it should be understood that various changes, substitutions and alterations can be made herein without departing from the technology of the disclosure as defined by the appended claims. Moreover, the scope of the present application is not intended to be limited to the particular configurations of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

While the systems and methods for congestion management for broadband data services have been disclosed and illustrated in connection with certain embodiments, many variations and modifications will be evident to those skilled in the art and may be made without departing from the spirit and scope of the disclosure. The disclosure is thus not to be limited to the precise details of methodology or construction set forth above as such variations and modification are intended to be included within the scope of the disclosure.

What is claimed is:

1. A method for adaptive congestion management comprising:
   determining data usage of an edge network segment, the data usage being determined in part using an exponentially weighted moving average, the exponentially weighted moving average being based on historic data usage measurements;
   determining when the data usage on the edge network segment crosses a first threshold of data usage, wherein the edge network segment branches out to include a plurality of customer segments;
   comparing recent usage data associated with each of a plurality of customers with usage characteristics of a plurality of predefined application-type usage patterns to determine an application type associated with each of the plurality of customers recent usage data, wherein the application type includes at least one of a file transfer type, a video data transfer type, or an internet web browsing type;
   based on the determination of the application type associated with each of the plurality of customers recent usage data, determining a customer usage profile for each of the plurality of customers, each of the customer usage profiles identifying the application type of that customer's recent usage;
   selecting, based at least in part on the application types of the determined customer usage profiles and based at least in part on the sensitivity of the application types to having a data transfer rate reduced, one or more of the customer segments to manage from among the plurality of customer segments, wherein the application types include at least one of the file transfer type, the video data transfer type, or the internet web browsing type; and
   adjusting the data transfer rate for all transferred data on one or more of the customer segments on the edge network segment by an amount predetermined by the application types associated with the determined customer usage profiles for the one or more customer segments when the data usage of the edge network segment crosses the first threshold of data usage, wherein adjusting the data transfer rate comprises restricting the data transfer rate for the one or more customers when the data usage on the edge segment crosses the first threshold from an uncongested rate to a congested rate.

2. The method of claim 1, further comprising:
   gathering periodic measurements of data on the edge network segment;
   determining when the data usage crosses the first threshold of data usage based on the periodic measurements.

3. The method of claim 1, further comprising:
   determining the customer usage profile for the one or more customers based on per-customer measurements.

4. The method of claim 1, wherein adjusting the data rate comprises:
   removing a restriction of the data transfer rate for the one or more customers when the data usage on the edge network segment crosses a second threshold from the congested rate to the uncongested rate.

5. The method of claim 1, further comprising:
   determining the first threshold based on a history of measurements for the edge network segment.

6. An apparatus for adaptive congestion management comprising:
   means for determining data usage of an edge network segment, the data usage being determined in part using an exponentially weighted moving average, the exponentially weighted moving average being based on historic data usage measurements;
   means for determining when the data usage on the edge network segment crosses a first threshold of data usage, wherein the edge network segment branches out to include a plurality of customer segments;
   means for comparing recent usage data associated with each of a plurality of customers with usage characteristics of a plurality of predefined application-type usage patterns to determine an application type associated with each of the plurality of customers recent usage data, wherein the application type includes at least one of a file transfer type, a video data transfer type, or an internet web browsing type;
   based on the determination of the application type associated with each of the plurality of customers recent usage data, means for determining a customer usage profile for each of the plurality of customers, each of the customer usage profiles identifying the application type of that customer's recent usage;
   means for selecting, based at least in part on the application types of the determined customer usage profiles and based at least in part on the sensitivity of the application types to having a data transfer rate reduced, one or more of the customer segments to manage from among the plurality of customer segments, wherein the application types include at least one of the file transfer type, the video data transfer type, or the internet web browsing type; and
   means for adjusting the data transfer rate for all transferred data on one or more of the customer segments by an amount predetermined by the application types associated with the determined customer usage profiles for one or more of the customer segments on the edge network segment when the data usage of the edge network segment crosses the first threshold of data usage, wherein adjusting the data transfer rate comprises restricting the data transfer rate for the one or more customers when the data usage on the edge segment crosses the first threshold from an uncongested rate to a congested rate.

7. The apparatus of claim 6, further comprising:
   means for gathering periodic measurements of data on the network segment;
   means for determining when the data usage crosses the first threshold of data usage based on the periodic measurements.

8. The apparatus of claim 6, further comprising:
   means for determining the customer usage profile for the one or more customers based on per-customer measurements.

9. The apparatus of claim 6, wherein the means for adjusting the data rate comprises:
   means for removing a restriction of the data transfer rate for the one or more customers when the data usage on the edge network segment crosses a second threshold from the congested rate to the uncongested rate.

10. The apparatus of claim 6, further comprising:
means for determining the first threshold based on a history of measurements for the edge network segment.

11. A non-transitory computer readable medium storing computer executable instructions for:
determining data usage of an edge network segment, the data usage being determined in part using an exponentially weighted moving average, the exponentially weighted moving average being based on historic data usage measurements;
determining when the data usage on the edge network segment crosses a first threshold of data usage, wherein the edge network segment branches out to include a plurality of customer segments;
comparing recent usage data associated with each of a plurality of customers with usage characteristics of a plurality of predefined application-type usage patterns to determine an application type associated with each of the plurality of customers recent usage data, wherein the application type includes at least one of a file transfer type, a video data transfer type, or an internet web browsing type;
based on the determination of the application type associated with each of the plurality of customers recent usage data, determining a customer usage profile for each of the plurality of customers, each of the customer usage profiles identifying the application type of that customer's recent usage;
selecting, based at least in part on the application types of the determined customer usage profiles and based at least in part on the sensitivity of the application types to having a data transfer rate reduced, one or more of the customer segments to manage from among the plurality of customer segments, wherein the application types include at least one of the file transfer type, the video data transfer type, or the internet web browsing type; and
adjusting the data transfer rate for all transferred data on one or more of the customer segments by an amount predetermined by the application types associated with the determined customer usage profiles for one or more of the customer segments on the edge network segment when the data usage of the edge network segment crosses the first threshold of data usage, wherein adjusting the data transfer rate comprises restricting the data transfer rate for the one or more customers when the data usage on the edge segment crosses the first threshold from an uncongested rate to a congested rate.

12. The non-transitory computer readable media of claim 11, also storing computer executable instructions for:
gathering periodic measurements of data on the network segment; and
determining when the data usage crosses the first threshold of data usage based on the periodic measurements.

13. The non-transitory computer readable media of claim 11, also storing computer executable instructions for:
determining the first threshold based on a history of measurements for the edge network segment.

14. A method for adaptive congestion management comprising:
gathering periodic measurement data of usage of an edge segment of a network, wherein the edge network segment branches out to include a plurality of customer segments;
determining data usage of the edge network segment, the data usage being determined in part using an exponentially weighted moving average, the exponentially weighted moving average being based on historic data usage measurements;
determining when the data usage of the edge segment crosses a threshold from uncongested to congested;
comparing recent usage data associated with each of a plurality of customers with usage characteristics of a plurality of predefined application-type usage patterns to determine an application type associated with each of the plurality of customers recent usage data, wherein the application type includes at least one of a file transfer type, a video data transfer type, or an internet web browsing type;
based on the determination of the application type associated with each of the plurality of customers recent usage data, determining a customer usage profile for each of the plurality of customers, each of the customer usage profiles identifying an application type of that customer's recent usage;
selecting, based at least in part on the application types of the determined customer usage profiles and based at least in part on the sensitivity of the application types to having a data transfer rate reduced, one or more of the customer segments to manage from among the plurality of customer segments, wherein the application types include at least one of the file transfer type, the video data transfer type, or the internet web browsing type;
computing a restricted transfer rate for all transferred data on one or more of the customer segments and corresponding to each of one or more of the customer segments based on the application types associated with the calculated usage profiles; and
applying the restricted transfer rate for all transferred data on one or more of the customer segments to each of the one or more of the customer segments based on the application types associated with the calculated usage profiles when the data usage on the edge segment crosses the threshold from uncongested to congested.

15. The method of claim 14, comprising:
determining when the edge segment crosses a threshold from congested to uncongested;
determining if customer segments on the edge segment have a restricted transfer rate; and
removing the restricted transfer rate from at least a subset of the customer segments that have the restricted transfer rate.

16. The method of claim 1, wherein usage characteristics of a plurality of predefined application-type usage patterns comprise at least one of transferred bytes, transferred packets, delayed packets, and discarded packets.

17. The method of claim 1, wherein restricting the data transfer rate for the one or more customers when the data usage on the edge segment crosses the first threshold from the uncongested rate to the congested rate further comprises:
first restricting all the transferred data for customer segments associated with the customer usage profiles associated with the file transfer type;
determining whether the data transfer rate is still congested after restricting the customer usage profiles associated with the file transfer type; and
based on a determination that the data transfer rate is still congested, restricting all the transferred data for customer segments associated with the customer usage profiles associated with the video data transfer type.

18. The method of claim 4, wherein removing the restriction of the data transfer rate for the one or more customers when the data usage on the edge network segment crosses the second threshold from the congested rate to the uncongested rate further comprises:
  determining one or more restricted customer usage profiles associated a particular application-type;
  selecting a subset of the one or more restricted customer usage profiles associated the particular application-type to remove the restriction of the data transfer rate for all the transferred data; and
  removing the restriction of the data transfer rate for the selected subset of the one or more restricted customer usage profiles associated the particular application-type.

* * * * *